(No Model.)
4 Sheets—Sheet 1.
H. G. WIDMAN.
REFRIGERATING CAR AND APPARATUS FOR SHIPPING MEAT.
No. 293,832. Patented Feb. 19, 1884.
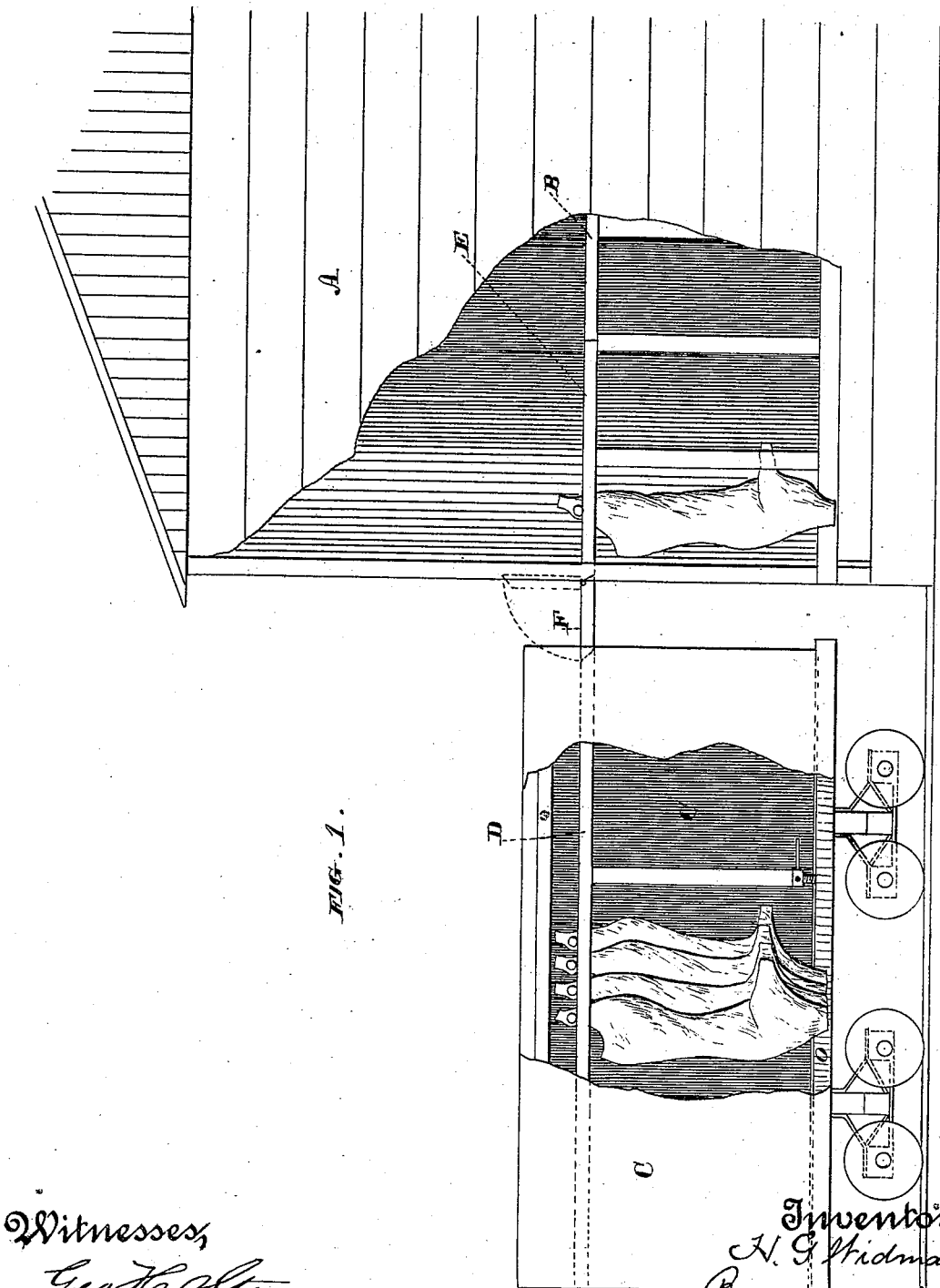

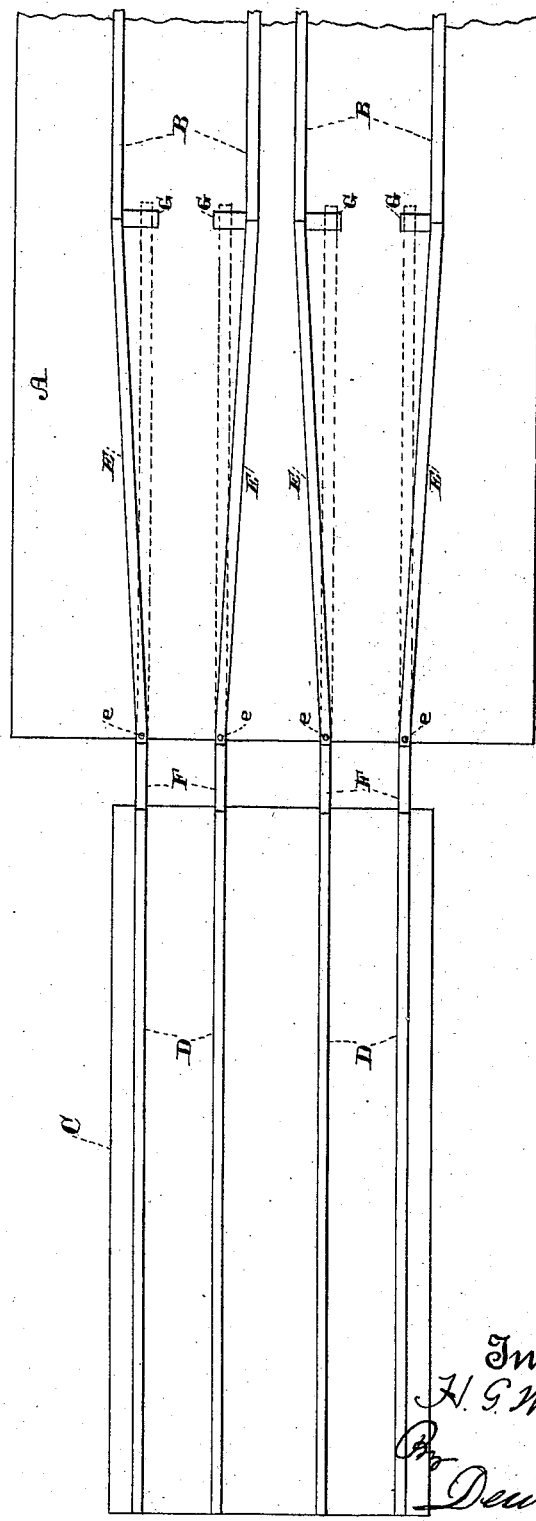

(No Model.) 4 Sheets—Sheet 3.
H. G. WIDMAN.
REFRIGERATING CAR AND APPARATUS FOR SHIPPING MEAT.
No. 293,832. Patented Feb. 19, 1884.
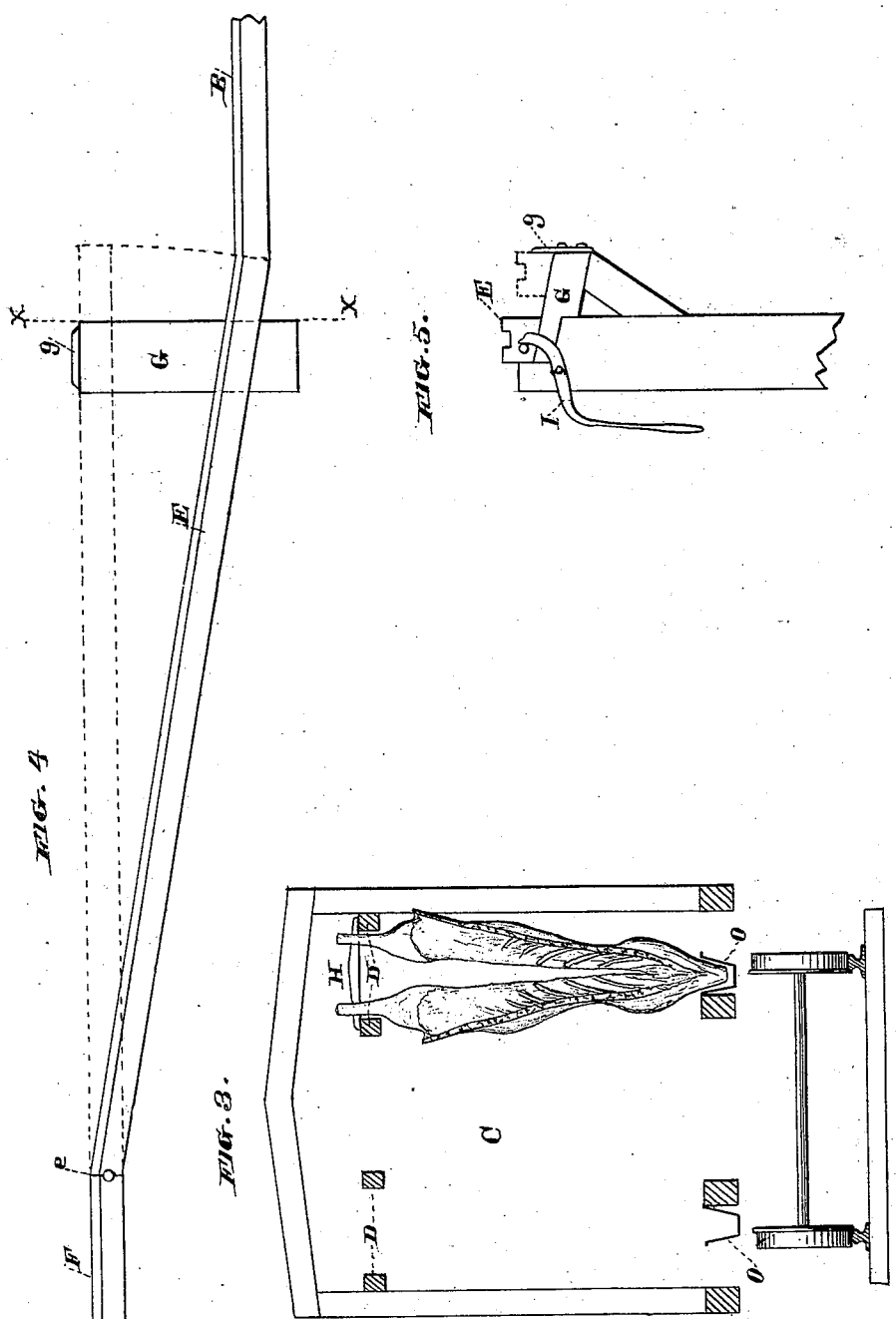
Witnesses,
Geo. H. Strong.
J. H. Nurse
Inventor,
H G Widman
By Dewey & Co.
Attorneys (No Model.) 4 Sheets—Sheet 4.
H. G. WIDMAN.
REFRIGERATING CAR AND APPARATUS FOR SHIPPING MEAT.
No. 293,832. Patented Feb. 19, 1884.
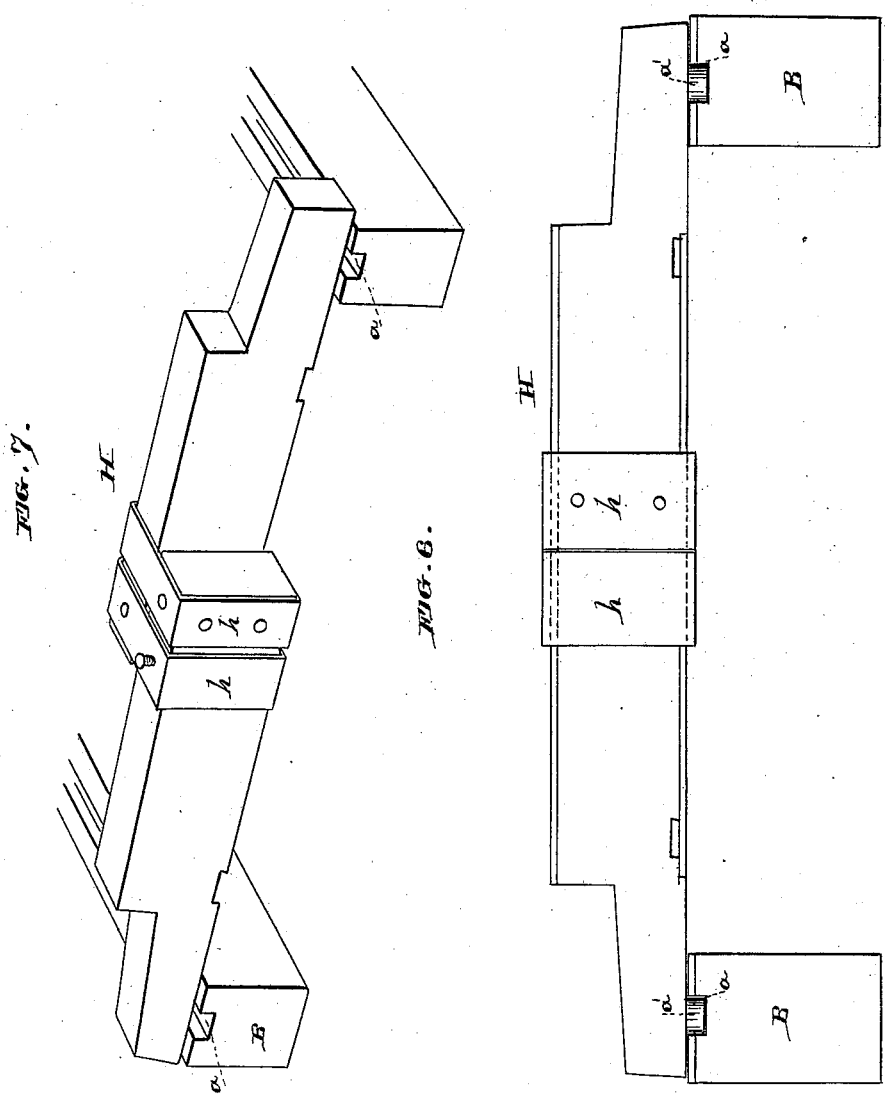

UNITED STATES PATENT OFFICE.

HERMAN G. WIDMAN, OF SAN FRANCISCO, CALIFORNIA.

REFRIGERATING CAR AND APPARATUS FOR SHIPPING MEAT.

SPECIFICATION forming part of Letters Patent No. 293,832, dated February 19, 1884.

Application filed November 12, 1883. (No model.)

*To all whom it may concern:*

Be it known that I, HERMAN G. WIDMAN, of the city and county of San Francisco, State of California, have invented an Improvement in Refrigerating Cars and Apparatus for Shipping Meat; and I hereby declare the following to be a full, clear, and exact description thereof.

My invention relates to a new and useful improvement in transporting or shipping meat from the slaughter-house to the market, the nature and object of which I will explain fully.

Heretofore in transporting meat from the slaughter-house to the market the practice has been, after slaughtering the animals, to quarter them and pack them into cars specially adapted for their reception. This practice was designed to overcome the undesirable method of transporting live animals, to which the objections of driving, rendering them poor, and the inability to pack many together existed; but to this present practice of quartering there are serious objections, principally lying in the appearance of the meat upon arriving at the destination. When quartered hot, the flanks shrink and spoil the shape, and the meat does not look clean and healthy, as when first slaughtered. Again, it needs handling, and when packed is apt to heat, which are objectionable features. My invention overcomes these difficulties by enabling me, after slaughtering the animals and dressing them while hanging on the gambrels, to run the carcasses entire into the car and transport them still in a suspended condition to the market, where they arrive in good condition, just as they were slaughtered.

My invention therefore consists in the improvement in transporting or shipping meat from the slaughter-house to the market, consisting in packing suspended carcasses entire within the car. It further consists in the means which enables me to accomplish the result to the best advantage—namely, in getting as many as possible into the car, thus utilizing its full capacity, and in doing this without handling the meat, as I shall hereinafter fully explain.

Reference being made to the accompanying drawings, Figure 1 is a side elevation of slaughter-house and car, a portion of the wall of each being broken away to show the interiors and the carcasses suspended in the car. Fig. 2 is a horizontal section or plan of house and car, showing the gambrel-tracks and switch. Fig. 3 is a cross-section of car. Fig. 4 is a plan of one rail of the switch, showing its connection with the wide and narrow gage track. Fig. 5 is a cross-section on line *x x*, Fig. 4. Fig. 6 is an elevation of the gambrel fitted upon the track. Fig. 7 is a perspective view of the gambrel.

A is a portion of the slaughter-house, in which two gambrel-tracks, B, Fig. 2, are suitably constructed. These tracks have a wide gage of four feet, or thereabout, as space in the slaughter-house is not contracted, and a wide stretch in dressing the carcasses is to be desired.

C is the meat-car, having built within it near its top, on each side, the tracks D, Figs. 2, 3. These are of a narrow gage—say about two feet—suitable for the width of the car.

E are the switch-tracks, the outer ends of which are pivoted at *e*, Figs. 2, 4, and are in relation with narrow-gage hinged short tracks F, Figs. 1, 2, which connect the switch-tracks with the tracks D of the car. The inner ends of the switch-tracks are expanded to the gage of tracks B, Fig. 2. All these tracks are suitably supported upon uprights and beams. The inner ends of the switch-rails are but in loose relation with the tracks B, and are supported upon short cross-beams G, Figs. 4, 5, which have a downward inclination from each side toward the center of each track, and terminate at a distance apart equal to the narrow gage of the tracks D F, as shown in Fig. 2. The inner ends of the switch-rails are therefore adapted to slide down these cross-beams to the narrow gage, where they are limited by stops *g*. This I shall more fully explain in connection with the gambrel, when its object will become plain.

H is the gambrel, Fig. 6. This is constructed in such manner as to render it extensible, and I herein show it as consisting of two pieces lying parallel, with their ends overlapping. Upon the adjacent ends of each piece are secured bands *h*, each of which embraces the end of the other piece, so that the two pieces may be drawn out or contracted to make the gambrel longer or shorter, as in telescoping sections. The tracks are all provided with grooves *a*, into which fit studs *a'*, under the ends of the gambrel, whereby the latter is held to its place on the tracks, and are adapted to travel thereon. The inner ends of the switch-rails are held to their places in relation with the wide-gage tracks B by any suitable device, such as a catch-lever, I, Fig. 5.

An explanation of the operation of the parts described will now be of advantage in understanding the invention up to this point. My chief object is to transport to the best advantage the entire carcass, so that it will be in as good condition at the market as when slaughtered. This I accomplish by the fact of suspending the carcasses in the car. This suspension avoids the necessity of quartering and of handling, and it enables me to get nearer the actual capacity of the car than in any other method of packing. This advantage of packing in a suspended condition I am enabled to acquire by the means described. The car is backed up to the slaughter-house, and its tracks D are connected by means of the hinged tracks F, Fig. 1, with the tracks of the slaughter-house. The tracks in the car being narrow for the sake of space, and the tracks in the house being wider for convenience in working, it becomes necessary to have some switching device to run the suspended carcasses from the house into the car without handling them. This is the object of the switch-rails E. These are held in connection with the tracks B, and the gambrel, with its suspended carcass, is moved forward to them, when they are released. Under the weight of this load they slide down the inclined beams G toward a narrower gage until they are limited by the stops g. To this movement the gambrel is no obstacle, because of its construction. It closes up to the necessary gage, and may then be pushed along into the car. Of course I may split the carcass down the backbone nearly to the neck, and this is preferable, as it saves trouble without interfering with the main principle of suspending the entire carcass. The operation is repeated until the entire car is packed with suspended carcasses which were not handled in the packing. They reach the market in good shape, are not heated or shrunk, and are more salable. It is designed to unload the carcasses in similar manner without handling.

The height of meat-cars from the track is generally about thirteen feet four inches, and for reasons of their own railroad companies decline to build them higher. As a matter of fact, the carcasses of beef, when suspended in the manner I have shown, require more height than is usually found in the cars. The necks must therefore either drag on the floor or be disposed of in another way. I overcome this difficulty by cutting slots through the floor of the car and building under them gutter-ways O, of galvanized iron or other suitable substance, as shown in Fig. 3. In these gutter-ways the necks of the carcasses hang, and when they are being pushed in a man lifts them over the cross-beams of the car, so that little trouble is encountered. In this way I get the required height without materially altering the car.

I have not referred to the subject of the construction of the car in other respects than those which are my invention. Of course I would use refrigerator-cars having an ice-well, padded walls, and adapted to be connected with suitable refrigerating devices, or with heating devices, according to the season.

Having thus described my invention, what I claim as new, and desire to secure by Letters Patent, is—

1. An improved apparatus for shipping meat, consisting of a slaughter-house building having elevated tracks B, a meat-car having elevated tracks D, an elevated-track connection between said tracks, and gambrels fitted and traveling upon said tracks and adapted to suspend entire carcasses of slaughtered animals, whereby they may be pushed from the slaughter-house into the car, substantially as herein described.

2. In an apparatus for shipping meat, elevated tracks of a wide gage in the slaughter-house, elevated tracks of a narrow gage in the car, a switch-track connection between them, and an extensible gambrel adapted to travel on said tracks and to be switched from one to the other, substantially as herein described.

3. In an apparatus for shipping meat, the wide-gage tracks B in the slaughter-house, the narrow-gage tracks D in the car, the pivoted switch-track E, having a gage at its outer end corresponding with tracks D and connected therewith, and its inner end loosely in relation with tracks B, whereby its gage may be widened or contracted, and an expanding gambrel adapted to travel on said tracks, substantially as herein described.

4. In an apparatus for shipping meat, the wide-gage tracks B in the slaughter-house, the narrow-gage tracks D in the car, the pivoted switch-track E, having a gage at its outer end corresponding with tracks D and connected therewith, and its inner end resting on inclined beams G, whereby it may be expanded to the gage of tracks B and contracted to the gage of tracks D, and an expanding gambrel traveling on said tracks, substantially as herein described.

5. In an apparatus for shipping meat, the tracks B D in the slaughter-house and car, of different gages, and the expanding switch-track E between them, as described, said tracks having grooves a, in combination with the gambrel H, constructed of telescoping sections, and having the studs a', fitting said grooves, substantially as herein described.

6. In an apparatus for shipping meat, elevated tracks in the slaughter-house, elevated tracks in the car, and the tracks F connecting them, in combination with a gambrel mounted and traveling upon said tracks, substantially as herein described.

In witness whereof I have hereunto set my hand.

HERMAN G. WIDMAN.

Witnesses:
S. H. NOURSE,
H. C. LEE.